(12) United States Patent
Jain et al.

(10) Patent No.: US 7,913,106 B2
(45) Date of Patent: Mar. 22, 2011

(54) FAILOVER IN A HOST CONCURRENTLY SUPPORTING MULTIPLE VIRTUAL IP ADDRESSES ACROSS MULTIPLE ADAPTERS

(75) Inventors: Vinit Jain, Austin, TX (US); Mallesh Lepakshaiah, Balgalore (IN); Elizabeth J. Murray, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/958,548

(22) Filed: Dec. 18, 2007

(65) Prior Publication Data

US 2009/0158082 A1   Jun. 18, 2009

(51) Int. Cl.
*G06F 11/00* (2006.01)
(52) U.S. Cl. ............................................................ 714/4
(58) Field of Classification Search ...................... 714/4; 709/223–226
See application file for complete search history.

(56) References Cited

U.S. PATENT DOCUMENTS

| | | | |
|---|---|---|---|
| 5,917,997 A | 6/1999 | Bell | |
| 5,978,938 A * | 11/1999 | Kaiser et al. | 714/48 |
| 6,078,957 A * | 6/2000 | Adelman et al. | 709/224 |
| 6,108,300 A * | 8/2000 | Coile et al. | 370/217 |
| 6,657,974 B1 | 12/2003 | Britton | |
| 6,675,206 B1 | 1/2004 | Britton | |
| 6,718,383 B1 * | 4/2004 | Hebert | 709/224 |
| 6,941,384 B1 * | 9/2005 | Aiken et al. | 709/250 |
| 7,020,796 B1 | 3/2006 | Ennis et al. | |
| 7,039,008 B1 * | 5/2006 | Howes et al. | 370/220 |
| 7,055,173 B1 * | 5/2006 | Chaganty et al. | 726/11 |
| 7,152,179 B1 * | 12/2006 | Critchfield | 714/4 |
| 7,275,175 B2 * | 9/2007 | Cardona et al. | 714/4 |
| 7,506,214 B2 * | 3/2009 | Anglin et al. | 714/43 |
| 7,697,312 B2 * | 4/2010 | Tanaka et al. | 365/63 |
| 2002/0133602 A1 * | 9/2002 | Godwin et al. | 709/229 |
| 2002/0133608 A1 * | 9/2002 | Godwin et al. | 709/230 |
| 2003/0018813 A1 * | 1/2003 | Antes et al. | 709/245 |
| 2003/0018927 A1 | 1/2003 | Gadir et al. | |
| 2003/0223466 A1 * | 12/2003 | Noronha et al. | 370/537 |

(Continued)

OTHER PUBLICATIONS

"HP Parallel Library TCP/IP Software", Copyright Hewlett-Packard Company, Jul. 2002, pp. 1-4, 4 pages, [Available Online]. Accessed Online At <http://h20223.www2.hp.com/NonStopComputing/downloads/EAFailoverTCP-IP-PL.pdf>.

(Continued)

*Primary Examiner* — Robert Beausoliel
*Assistant Examiner* — Amine Riad
(74) *Attorney, Agent, or Firm* — David A. Mims, Jr.; Amy J. Pattillo (57) ABSTRACT

A host enables any adapter of multiple adapters of the host to concurrently support any VIPA of the multiple VIPAs assigned to the host. Responsive to a failure of at least one particular adapter from among the multiple adapters, the host triggers the remaining, functioning adapters to broadcast a separate hardware address update for each VIPA over the network, such that for a failover in the host supporting the multiple VIPAs the host directs at least one other host accessible via the network to address any new packets for the multiple VIPAs to one of the separate hardware addresses of one of the remaining adapters.

7 Claims, 4 Drawing Sheets

U.S. PATENT DOCUMENTS

| | | | |
|---|---|---|---|
| 2003/0237018 A1* | 12/2003 | Baba ................................. | 714/4 |
| 2004/0085893 A1* | 5/2004 | Wang et al. ..................... | 370/216 |
| 2004/0215752 A1* | 10/2004 | Satapati et al. ............... | 709/223 |
| 2005/0010837 A1* | 1/2005 | Gallagher et al. ............ | 714/100 |
| 2005/0125557 A1* | 6/2005 | Vasudevan et al. ........... | 709/239 |
| 2005/0259632 A1* | 11/2005 | Malpani et al. ............... | 370/351 |
| 2008/0040573 A1* | 2/2008 | Malloy et al. ................. | 711/202 |
| 2008/0263209 A1* | 10/2008 | Pisharody et al. ............ | 709/227 |
| 2008/0285436 A1* | 11/2008 | Robinson ....................... | 370/217 |
| 2009/0037763 A1* | 2/2009 | Adhya et al. ....................... | 714/4 |
| 2009/0037998 A1* | 2/2009 | Adhya et al. .................... | 726/11 |
| 2009/0073875 A1* | 3/2009 | Kashyap ........................ | 370/228 |
| 2009/0144817 A1* | 6/2009 | Kumar et al. ................... | 726/12 |
| 2010/0097925 A1* | 4/2010 | Bell .............................. | 370/219 |

OTHER PUBLICATIONS

"Network Multipathing in the Solaris 9 Operating Environment", Copyright Sun Microsystems, 2002, 2 pages, [Available Online]. Accessed Online At <http://www.sun.com/software/solaris/9/ds/ds-netmultipath/ipmp.pdf>.

David C. Plummer, "RFC 826, An Ethernet Address Resolution Protocol", Nov. 1982, 8 pages, [Available Online]. Accessed Online At <http://www.rfc-editor.org/rfc/rfc826.txt>.

Sheila Endres and Kim Tran, "How to: Easily Configure TCP/IP on Your AIX System", International Business Machines Corporation, Published Nov. 30, 2000,1-10 pages.

* cited by examiner

FAILOVER IN A HOST CONCURRENTLY SUPPORTING MULTIPLE VIRTUAL IP ADDRESSES ACROSS MULTIPLE ADAPTERS

BACKGROUND OF THE INVENTION

1. Field of the Invention

The present invention relates generally to an improved host system within a network and in particular to an improved failover in a host with multiple adapters enabled to concurrently support multiple virtual Internet Protocol (IP) addresses (VIPAs).

2. Description of the Related Art

The Address Resolution Protocol (ARP), used in Transport Control Protocol/Internet Protocol (TCP/IP) networks, such as the Internet, provides a mapping between an IP address and a media access control (MAC) address to a requesting host. In one example, a requesting host which needs to learn the MAC address for a given IP address broadcasts an ARP request containing the IP address to all routers and hosts in a network. Adapters at the hosts receive the requests. The adapter assigned the IP address responds to the ARP request with an ARP reply including the MAC address corresponding to the IP address. Thus, the requesting host learns the MAC address corresponding to the IP address through an ARP reply to an ARP request.

A "real" IP address is one that is associated with a physical adapter. An adapter often supports thousands of network sessions with other hosts. If the adapter fails, all of the active sessions using the IP address associated with the adapter will also fail. Virtual IP addresses (VIPAs) were conceived to mitigate this problem. A VIPA is an IP address that is associated with a host, rather than with a physical adapter. Messages can be addressed to real IP addresses or to VIPA. If a host contains multiple adapters, IP traffic addressed to a VIPA can be routed through any of the adapters. In this way, a host can provide fault tolerance after an adapter failure by routing the VIPA traffic over a different physical adapter.

A VIPA based failover system, however, is still limited in efficiency if more than one VIPA is assigned to a single host. In particular, white a single VIPA may be supported across multiple adapters, if multiple VIPAs are assigned by a host, each VIPA requires a separate set of adapters assigned solely to that VIPA. Separately assigning multiple adapters to each separate VIPA, however, may require assigning a separate backup adapter to each VIPA to facilitate failover in the event of an adapter failure. Assigning a separate backup adapter to each VIPA is an inefficient allocation of resources.

SUMMARY

Therefore, in view of the foregoing the present method, system, process, and program product provide for allowing any hardware adapter of a host to concurrently accept incoming data for any of multiple VIPAs associated with the host, while still allowing for efficient failover.

In one embodiment, a host enables any adapter of multiple adapters of the host to concurrently support any VIPA of the multiple VIPAs assigned to the host. Responsive to a failure of at least one particular adapter from among the multiple adapters, the host triggers the remaining, functioning adapters to broadcast a separate hardware address update for each VIPA over the network, such that for a failover in the host supporting the multiple VIPAs the host directs at least one other host accessible via the network to address any new packets for the multiple VIPAs to one of the separate hardware addresses of one of the remaining adapters.

The host enables any adapter of multiple adapters of the host to concurrently support any VIPA of the multiple VIPAs assigned to the host by configuring a network stack on the host to compare an IP address specified in an ARP request received at the host with a list of the multiple VIPAs to determine if the host supports the IP address in the list of VIPAs. Responsive to the host receiving an ARP request from a requesting host from among the at least one other host for a particular IP address matching a particular VIPA of the multiple VIPAs, the host triggers each of the adapters to send an ARP response to the requesting host with each hardware address of each adapter for the particular VIPA, wherein the requesting host stores one of the multiple ARP responses from the multiple adapters.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
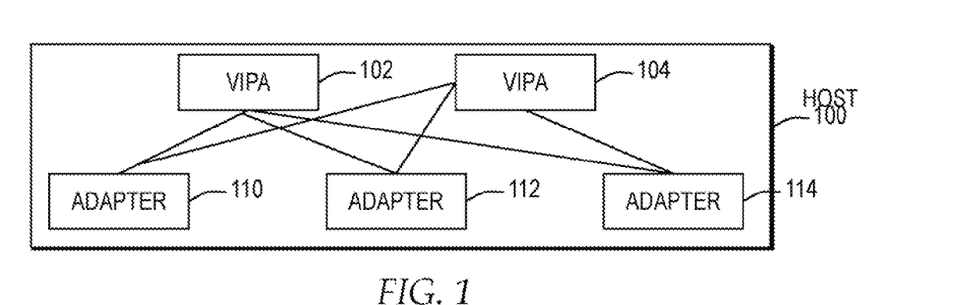
FIG. 1 is a block diagram depicting one example of a host assigned multiple adapters enabled for concurrently supporting multiple VIPAs.

With reference now to the Figure, and in particular with reference now to FIG. 1, a block diagram illustrates one example of a host assigned multiple adapters enabled for concurrently supporting multiple VIPAs. In the example, host 100 includes multiple adapters 110, 112, and 114. In addition, in the example, multiple VIPAs 102 and 104 are associated with a single host 100. In the example, host 100 may represent one or more physical or logical data processing systems, routers, or other systems which are connected to a network and receive or send data within the network. While in the example adapters 110, 112, and 114 are described as physical adapters, in other examples, one or more of adapters 110, 112, and 114 may represent virtual representations of one or more physical adapters.

In one examples within host 100, adapters 110, 112, and 114 are configured to each support both VIPA 102 and VIPA 104. By configuring adapters 110, 112, and 114 to concurrently support both VIPA 102 and 104, both VIPA 102 and VIPA 104 may accept incoming data on each of adapters 110, 112, and 114 and both VIPA 102 and VIPA 104 may route data through each of adapters 110, 112, and 114. Although not depicted, in another example, one of adapters 110, 112, and 114 may be set to initially receive incoming data and the remaining adapters may be set for load balancing outgoing data for both VIPA 102 and VIPA 104.

In the example, VIPA 102 and VIPA 104 represent virtual or logical IP addresses and adapters 110, 112, and 114 are each assigned a hardware address, such as a MAC address. In addition, it will be understood that VIPA 102 and VIPA 104 may represent real IP addresses and adapters 110, 112, and 114 may be assigned virtual addresses, multiple physical addresses, or other types of addressing.

In one example, both VIPA 102 and VIPA 104 are assigned to access a same service of host 100, where a service may include, but is not limited to, an application, data, or a function of host 100 or another system accessible to host 100. In another example, each of VIPA 102 and VIPA 104 are assigned to a separate service of host 100 and host 100 implements one or more additional processors or hardware to manage distribution of packets for different VIPAs for different services once received by host 100 through any of adapters 110, 112 and 114.

It is important to note that while in the example, VIPAs 102 and 104 are associated with host 100, in other examples any numbers of VIPAs may be associated with a single host or a cluster or other grouping of hosts and one or more VIPAs may be transferred from one host to another host. In addition, it is important to note that while in the example adapters 110, 112, and 114 are shared between VIPAs 102 and 104, in other embodiments, one or more of the adapters may be primarily assigned to a particular VIPA.

Figure 2:
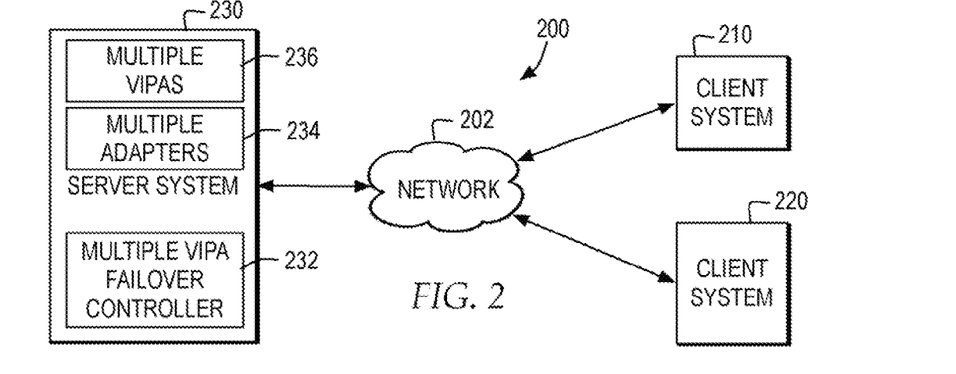
FIG. 2 is a block diagram illustrating one example of a network environment in which a host supports failover for multiple adapters enabled for concurrently supporting multiple VIPAs may be implemented.

Referring now to FIG. 2, a block diagram illustrates one example of a network environment in which a host supports failover for multiple adapters enabled for concurrently supporting multiple VIPAs may be implemented. It is important to note that network environment 200 is illustrative of one type of network environment which may support one or more hosts, each with one or more adapters for communicating within network environment 200, however, additional, alternate, or other types of hosts may be implemented in other network environments. In addition, it is important to note that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example. Network 202 may represent one or more of packet-switching based networks and telephony based networks, local area and wire area networks, public and private networks.

Network 202 may implement one or more layers of one or more types of network protocol stacks which may include one or more of a physical layer, a link layer, a network layer, a transport layer, a presentation layer, and an application layer. For example, network 202 may implement one or more of the Transmission Control Protocol/internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another. In other examples, network 202 may implement one or more different types of protocol stacks and other types of protocol stacks.

Network environment 200 may implement multiple types of network architectures. In one example, network environment 200 may be implemented using a client/server architecture, where computing systems requesting data or processes are referred to as clients and computing systems processing data requests and processes are referred to as servers. In another example, network environment 200 may be implemented in a peer-to-peer network architecture. In yet another example, network environment 200 may be implemented in a grid architecture. It will be understood that other types of network architectures and combinations of network architectures may be implemented in network environment 200.

In the embodiment, as illustrated, one or more of client system 210, client system 220, and server system 230 are communicatively connected via network 202 within network environment 200. In general, client system 210 and client system 220 request one or more services from server system 230 via network 202 and data delivered by server system 230 is output to client system 210 and client system 220 via network 202. It will be understood that each of client system 210 and client system 220 may be implemented as a server for receiving requests for services and delivering data or other output to other systems. In addition, it will be understood that server system 230 may be implemented as a client system for sending requests for services and receiving outputs from other systems over network 202. It will be understood that network environment 200 may include one or more client systems, one or more server systems, and one or more instances of network 202 communicatively connecting the systems within network environment 200.

As illustrated, each of client system 210, client system 220, and server system 230 may represent a host, such as host 100 of FIG. 1. In addition, a grouping, cluster, or other network mapping may specify host 100 as including a combination of all or portions of client system 210, client system 220, and server system 230.

In particular, as illustrated in the embodiment, server system 230 represents a host with multiple adapters 234 enabled for concurrently supporting multiple VIPAs 236 through a multiple VIPA failover controller 232 implemented within one or more software and hardware layers of server system 230. Multiple VIPA failover controller 232 also supports failover when one of multiple adapters 234 enabled for concurrently supporting multiple VIPAs 236 fails or is removed.

First, multiple VIPA failover controller 232 enables each of multiple adapters 234 to accept data intended for any of multiple VIPAs 236. In one example, to enable any adapter to accept data intended for each of the VIPAs, multiple VIPA failover controller 232 triggers multiple adapters 234 check a list of multiple VIPAs 236 for each incoming packet to determine whether there is a match between the IP in an incoming packet and one of multiple VIPAs 236.

Second multiple VIPA failover controller 232 facilitates failover when one of multiple adapters 234 fails so that no current connections to server system 230 are interrupted. In one example, since any of multiple adapters 234 may accept data intended for a VIPA, client system 210 or client system 220 receives a physical address for each of multiple adapters 234 and selects one of the physical addresses to use in addressing a packet to server system 230 for one of multiple VIPAs 236. If one of multiple adapters 234 fails, then multiple VIPA failover controller 232 broadcasts an update to all other hosts, such as client system 210 and client system 220, with the update that the physical address for each of multiple VIPAs 236 has changed. Since a connection between client system 210 and client system 220 with server system 230 is bound to the VIPA, client system 210 or client system 220 send any new packets to server system 230 to one of the updated functional adapter physical addresses, without interrupting the current connection.

It is important to note that in addition to the distribution of multiple VIPA failover controller 232 described with reference to server system 230, multiple VIPA failover controller 232 may be distributed among additional or alternate systems in a network environment, such as client system 210, client system 220, or within network 202. In addition, multiple VIPA failover controller 232 may be distributed among multiple logical network partitions distributed within a single client system 210 or 220, server system 230, or network 202 or across multiple client systems, server systems, or networks. Further, multiple physical, logical or virtual instances of multiple VIPA failover controller 232 may be initiated at a client system, a server system or a network.

In particular, while it is understood that the process software of multiple VIPA failover controller may be deployed by manual loading directly in a system, such as multiple VIPA failover controller 232 of server system 230 and proxy computer systems (not depicted) via loading a storage medium such as a CD, DVD, etc., the process software may also be automatically or semi-automatically deployed into a computer system by sending the process software to a server system or a group of server systems. The process software is then downloaded into the client computers or server systems that will execute the process software. Alternatively, the process software is sent directly to the client system or server system via email or other electronic communication. The process software is then either detached to a directory or loaded into a directory by button on the email or other electronic communication that executes a program that detaches the process software into a directory. Another alternative is to send the process software directly to a directory on the client system or server system hard drive. When there are any proxy servers, the process will select the proxy server code, determine on which computers to place the proxy servers' code, transmit the proxy server code, then install the proxy server code on the proxy computer. The process software will be transmitted to the proxy server, then stored on the proxy server.

In addition, in particular, while it is understood that the process software of the multiple VIPA failover controller may be deployed separately from an operating system, a network stack, or network hardware, such as adapters, the process software may also be fully or partially integrated with or coexist with applications, operating system, or network services on client systems and server systems or functions of adapters or other network hardware in the network environment where the process software will function. Further, the process software of the multiple VIPA failover controller may be available as on demand on a shared server system.

Figure 3:
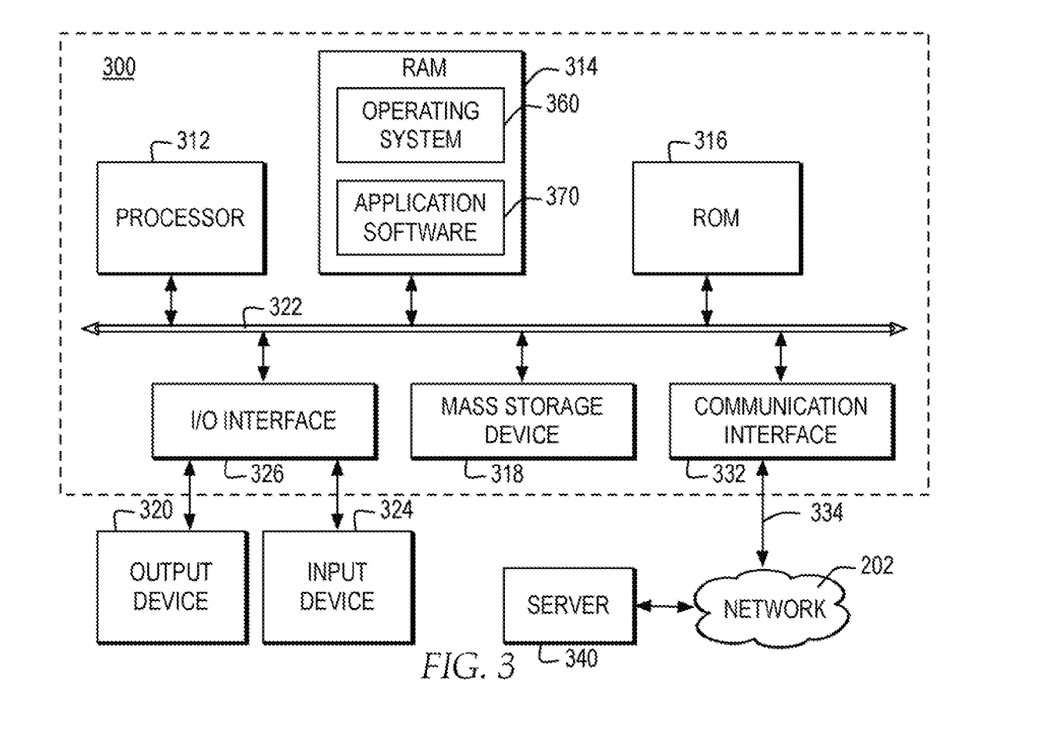
FIG. 3 is a block diagram depicting one embodiment of a computer system in which the present invention may be implemented.

With reference now to FIG. 3, a block diagram illustrates one embodiment of a computer system in which the present invention may be implemented. The processes, methods, computer program products, and systems of the present invention may be executed in a variety of systems, including a variety of computing systems, such as computer system 300, communicatively connected to a network, such as network 202. Computer system 300 may represent host 100 with one or more adapters or may be distributed among multiple hosts. In addition, computer system 300 may be grouped with other computer systems to represent host 100.

Computer system 300 includes a bus 322 or other communication device for communicating information within computer system 300, and at least one processing device such as processor 312, coupled to bus 322 for processing information. Bus 322 includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an operating system 360, application software 370, middleware (not depicted), network software, and other code accessible from a dynamic storage device such as random access memory (RAM) 314, a static storage device such as Read Only Memory (ROM) 316, a data storage device, such as mass storage device 318, or other data storage medium. Operating system 360, application software 370, or other layers of software may implement one or more of the components of multiple VIPA failover controller 232 described in FIG. 2.

Figure 8:
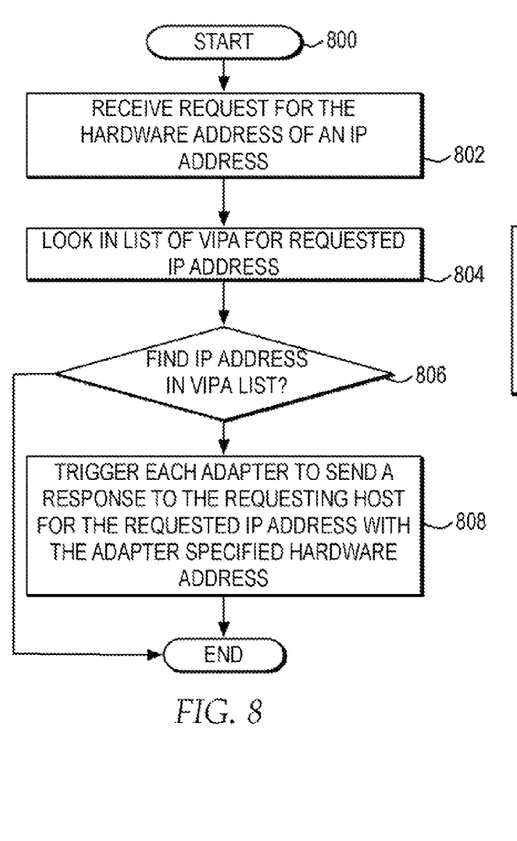
FIG. 8 is a high level logic flowchart depicting a process and program for a network stack of a receiving host responding to a request from a requesting host, where the receiving host enables multiple adapters to concurrently support multiple VIPAs.
Figure 9:
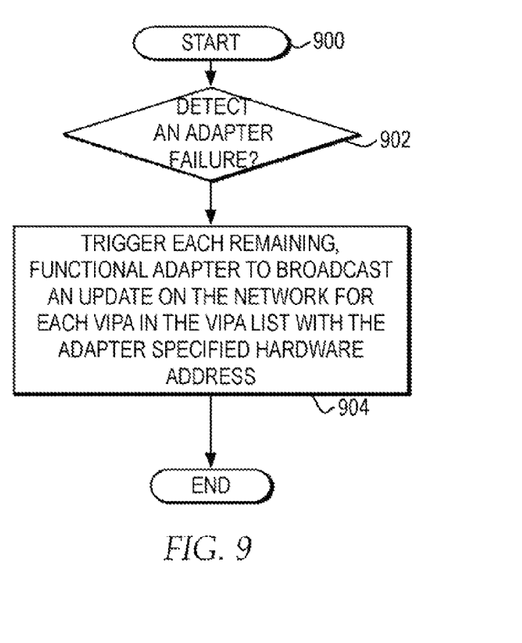
FIG. 9 is a high level logic flowchart illustrating a process and program for a network stack for a receiving host responding to a failed adapter for facilitating failover when the requesting host enables multiple adapters to concurrently support multiple VIPAs.

In one embodiment, the operations performed by processor 312 may control detecting search result links, predicting user interest in search result links based on current user interactions with the search result links, and dynamically reorganizing the search result links based on the current user interest, as described in the operations of the flowcharts of FIGS. 8 and 9 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 300 cause computer system 300 to perform a process according to the present invention. The terms "computer-readable medium" or "machine-readable medium" as used herein includes any medium that participates in providing instructions to processor 312 or other components of computer system 300 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318 which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 340 to requesting computer system 300 by way of data signals embodied in a carrier wave or other propagation medium via network 202 to a network link 334 (e.g. a modem or network connection) to a communications interface 332 coupled to bus 322. In one example, where processor 312 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 202 both use electrical electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. Input device 324 may include, for example, a microphone a video capture device, a body scanning system, a keyboard, a mouse, or other input peripheral device, communicatively enabled on bus 322 via I/O interface 326 controlling inputs. In addition, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention. For example, computer system 300 may also be a tablet computer, laptop computer, or telephone device.

Figure 4:
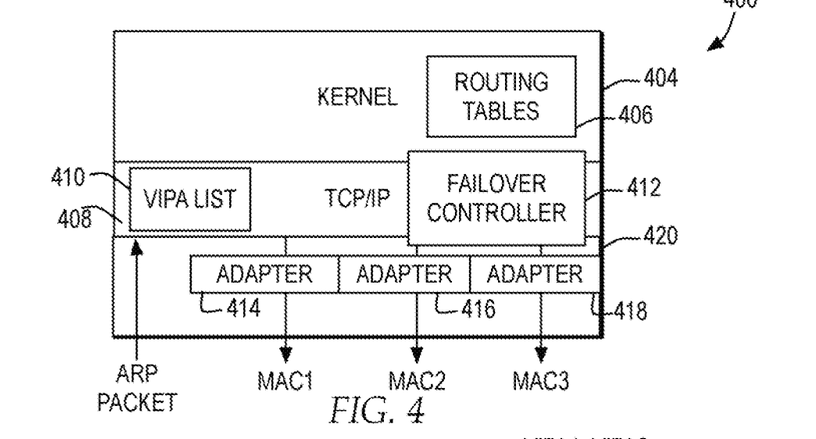
FIG. 4 is a block diagram illustrating a network stack for supporting efficient failover for multiple adapters enabled to concurrently support multiple VIPAs.

Referring now to FIG. 4, a block diagram illustrates a network stack for supporting efficient failover for multiple adapters enabled to concurrently support multiple VIPAs. It is important to note that the layers and components of network stack 400 may be distributed among multiple memory components, among multiple devices, among multiple interfaces, among multiple computing systems, and among multiple networks and network devices, such as routers. In addition, it is important to note that a network stack implementing the present invention may include additional or alternate layers, processes, and data from those depicted in network stack 400.

In the example, network stack 400 is described with reference to both a receiving host and a requesting host. In one example, when network stack 400 represents a receiving host, network stack 400 receives requests from one or more requesting hosts. In one example, when network stack 400 represents a requesting host, network stack 400 sends requests to a receiving host or one or more foreign hosts.

In the example, network stack 400 includes a kernel layer 404. Kernel layer 404 may include, but is not limited to, one or more instances of one or more types of operating systems, such as an instance of operating system 360, one or more instances of middleware, such as WebSphere (WebSphere is a registered trademark of International Business Machines Corporation) middleware which enables integration of multiple computer platforms.

In the example, kernel 404 may maintain routing tables 406. Routing tables 406 may include hardware, IP, and other levels of addressing of other hosts accessible via a network and may include interface addressing for one or more gateways. In one example, kernel 404 may maintain a cache of addresses accessed for other hosts and apply rules, such as a period of time since a host has been accessed, in determining which addresses to maintain in the cache.

In addition, in the example, network stack 400 includes a TCP/IP layer 408. In one implementation of multiple VIPA failover controller 232, TCP/IP layer 408 is enabled with a VIPA list 410. VIPA list 410 includes a system-wide list of IP addresses and VIPAs supported by network stack 400. Through the settings or processes in multiple VIPA failover controller 232, adapter layer 420 is set such that for incoming packets, such as an incoming ARP packet, the IP address requested in the incoming packet is checked against VIPA list 410 to determine if the IP address is supported by network stack 400.

By setting network stack 400 to check incoming packet IPs against VIPA list 410, an adapter from among adapters 414, 416, and 418 within adapter layer 420 may accept data intended for any VIPA within VIPA list 410. In particular, while VIPA list 410 is depicted as implemented within TCP/IP layer 408, it is important to note that VIPA list 410, and comparing a packet IP with VIPA list 410 may be performed in other layers, such as adapter layer 420. In addition, it is important to note that different layers or different components within different layers may maintain a separate instance of VIPA list 410.

In the example, network stack 400 is a receiving host and adapter layer 420 receives an ARP request for any of the VIPA in VIPA list 410, the request is pushed up to TCP/IP layer 408 which determines that the IP in the ARP request is one of the VIPA in VIPA list 410. TCP/IP layer 408 then triggers adapter layer 420 to send an ARP response on the network to the requesting host. In particular, TCP/IP layer 408 triggers each of adapters 414, 416, and 418 to send an ARP response for the requested VIPA to the requesting host, each specifying the ARP response with the MAC address for that adapter and the requested VIPA.

In the example, each adapter in adapter layer 420 is assigned a MAC hardware address. For example, adapter 414 is assigned a MAC1, adapter 416 is assigned a MAC2, and adapter 418 is assigned a MAC3. It will be understood that adapters 414, 416, and 418 may also be assigned multiple hardware addresses, a hardware address and a network address, or other types of addressing. In addition, it will be understood that adapter layer 420 may include additional or alternate adapters to the adapters represented by adapters 414, 416, and 418.

In the example, if VIPA list 410 includes VIPA1 and VIPA2, responsive to network stack 400 receiving an APR request for VIPA1, adapter 414 will send an APP reply of VIPA1, MAC1, adapter 416 will send an ARP reply of VIPA1, MAC2, and adapter 418 will send an ARP reply of VIPA1, MAC3. In addition, in the example, responsive to network stack 400 receiving an ARP request for VIPA, adapter 414 will send an APP reply of VIPA2, MAC1, adapter 416 will send an ARP reply of VIPA2, MAC2, and adapter 418 will send an ARP reply of VIPA2, MAC3.

If network stack 400 represents the requesting host, network stack 400 may receive multiple ARP replies for a particular ARP request for a VIPA, each with a different MAC address. At least one of the layers of network stack 400, such as kernel layer 404, applies ARP rules to select and cache one of the ARP replies in routing tables 406 or other cache and discard the other ARP replies. In addition, in an alternate embodiment, network stack 400 may cache all the ARP replies for a particular ARP request, but select only one of the ARP replies for sending packets and bind from TCP/IP layer 412 to the VIPA address through the selected MAC address in one of the APP replies.

Returning to network stack 400 representing the receiving host, a failover controller 412 of multiple VIPA failover controller 232 operating at one or more layers within network stack 400, detects adapter failures and triggers the functioning adapters to broadcast an ARP update for all VIPAs. For example, if failover controller 412 detects failure or removal of adapter 414, failover controller 412 triggers adapters 416 and 418 to broadcast APP updates for each of the VIPAs in VIPA list 410.

In the example if VIPA list 410 includes VIPA1 and VIPA2, responsive to failover controller 412 detecting a failover of an adapter, such as adapter 414, adapter 416 broadcasts an ARP update of VIPA1, MAC2 and an ARP update of VIPA2, MAC2 and adapter 418 broadcasts an ARP update of VIPA1, MAC3 and an ARP update of VIPA2, MAC3.

In one example, failover controller 412 is implemented within kernel layer 404. In particular, in one example, kernel layer 404 is able to detect failures within any of adapters 414, 416 or 418, such as through monitoring devices drivers and maintaining a status of each adapter. When kernel layer 404 is able to detect failures, through failover controller 412, kernel layer 404 instructs TCP/IP layer 408 to send out ARP updates for all the VIPAs in VIPA list 410 on the functioning adapters in the event of a failure in one or more adapters.

In another example, failover controller 412 is implemented within TCP/IP layer 408, adapter layer 420 or another layer, such as when adapters 414, 416, and 418 represent switches where kernel layer 404 is not able to detect failures in the switches. In particular, in one example, if TCP/IP layer 408, adapter layer 420 or another layer is able to detect failures in adapters that are not passed up to kernel layer 404, failover controller 412 may be implemented within TCP/IP layer 408, adapter layer 420 or another layer to trigger TCP/IP layer 408 or adapter layer 420 to send out ARP updates for all the VIPAs in VIPA list 410 on the functioning adapters in the event of a failure in one or more adapters.

The APP update is broadcast over a network such that all other hosts on the network that read the MAC address will detect the ARP update indicating the physical address has changed. In one example, the ARP update includes a same header or other identifier as an ARP reply, but the ARP update is broadcast generally within the network. In another example, an ARP update may include a different header or other identifier from an ARP reply that identifies the addressing is an update to previously received addressing.

Returning to network stack 400 representing the requesting host, when network stack 400 receives the broadcasted ARP updates, kernel layer 404 updates routing tables 406 with one MAC address broadcasted in the APP updates for each of the VIPAs according to ARP rules for selecting one ARP update for a VIPA and discarding others for the same VIPA. In the example, when a current connection is established between a requesting host and a receiving host, the requesting host binds to the IP of the receiving host, not to the physical address. By receiving an updated MAC address for all VIPAs in the APP updates at the requesting host, if the requesting host is currently connected to one of the updated VIPAs at a receiving host, the receiving host may redirect any new packets sent to the VIPA to one of the updated functional MAC addresses, without interrupting the current connection.

Figure 5:
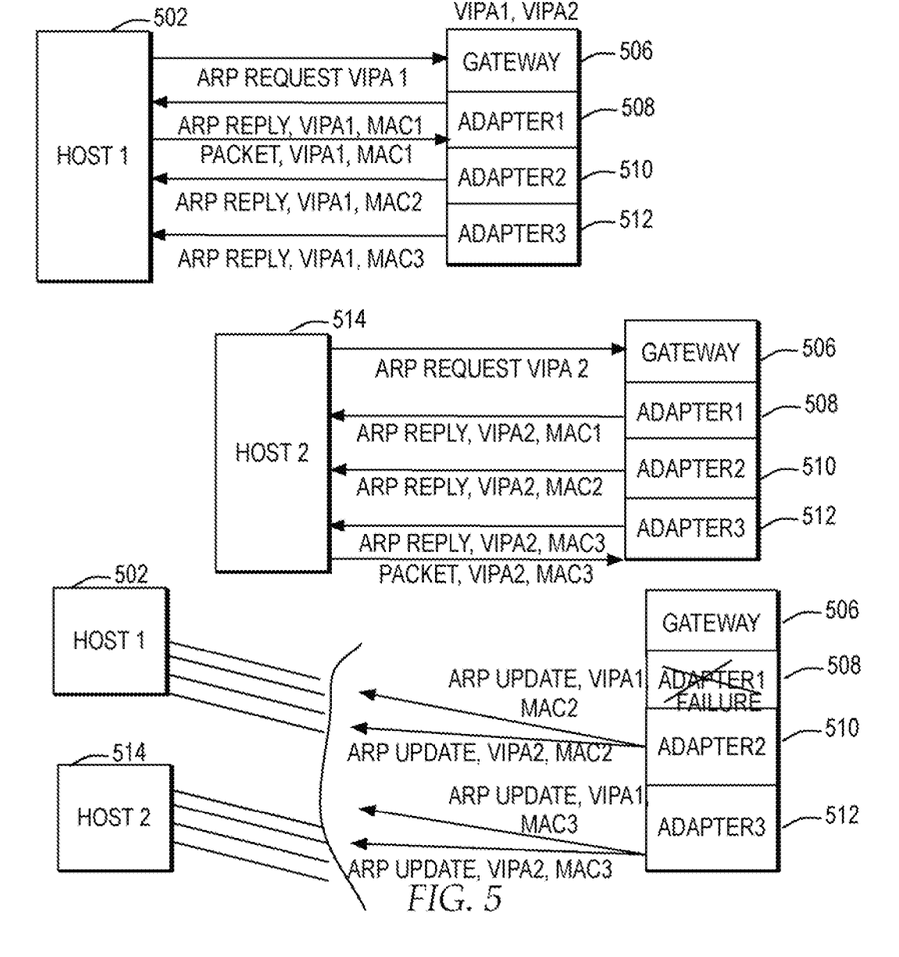
FIG. 5 is a flow diagram depicting one example of the ARP packets sent between multiple hosts and a gateway host, where the gateway host supports multiple adapters enabled to concurrently facilitate multiple VIPAs.

With reference now to FIG. 5, a flow diagram illustrates one example of the ARP packets sent between multiple hosts and a gateway host, where the gateway host supports multiple adapters enabled to concurrently facilitate multiple VIPAs.

In the example, a host1 502, acts as a requesting host and sends an ARP request for VIPA1 to gateway 506, which acts as a receiving host. Gateway 506 comprises adapter1 508, adapter2 510, and adapter3 512, which are all enabled to concurrently support multiple VIPAs represented as VIPA1 and VIPA2. Gateway 506 triggers each of adapter1 508, adapter2 510, and adapter3 512 to respond to the ARP request from host1 502 by sending an ARP reply. In the example, adapter1 508 sends an ARP reply with VIPA1 and MAC1, where MAC1 represents the hardware address for adapter1 508. Similarly, in the example, adapter2 510 sends an ARP reply with VIPA1 and MAC2, where MAC2 represents the hardware address for adapter2 510 and adapter3 512 sends an ARP reply with VIPA1 and MACS, where MAC3 represents the hardware address for adapter3 512.

As illustrated, host1 502 receives the multiple ARP replies and by applying ARP rules or other rules, selects the APP reply for adapter1 508. Host1 602 binds to VIPA1 through MAC1 on adapter1 508 of gateway 506.

In addition, in the example, a host2 514, acts as a requesting host and sends an ARP request for VIPA2 to gateway 506, which acts as a receiving host. Gateway 506 triggers each of adapter1 508, adapter2 510, and adapter3 512 to respond to the ARP request from host2 514 by sending an ARP reply. In the example, adapter1 508 sends an ARP reply with VIPA2 and MAC1, adapter2 510 sends an ARP reply with VIPA2 and MAC2, and adapter3 512 sends an ARP reply with VIPA2 and MAC3.

As illustrated, host2 514 receives the multiple ARP replies and by applying APP rules or other rules, selects the ARP reply for adapter3 512. Host2 514 binds to VIPA2 through MAC3 on adapter3 512 of gateway 506.

Gateway 506 next detects failure in adapter1 508. Host1 502 and host2 514 may select any of adapter1 508, adapter2 510, and adapter3 512 to send packets for VIPA1 or VIPA2, gateway 506 triggers adapter2 510 and adapter3 512 to broadcast ARP updates for both VIPA1 and VIPA2. In the example, adapter2 510 broadcasts APP updates for VIPA1, MAC2 and VIPA2, MAC2, which are detected by both host1 502 and host2 514. In addition, adapter3 512 broadcasts ARP updates for VIPA1, MACS and VIPA2, MAC3, which are detected by both host1 502 and host2 514.

Host1 502 receives ARP updates of VIPA1, MAC2; VIPA1, MAC3; VIPA2, MAC2; and VIPA2, MAC3, updates the cached MAC address for VIPA1 to either MAC2 or MAC3, and sends any new packets to the updated cached MAC address, without interrupting the connection to VIPA1. Host2 514 also receives APP updates of VIPA1, MAC2; VIPA1, MAC3; VIPA2, MAC2; and VIPA2, MAC3 and updates the cached MAC address for VIPA2. In one example, since MAC3 is still available for VIPA2, host2 514 may maintain MAC3 as the cached address for VIPA2 or host2 514 may arbitrarily select to cache one or more of MAC2 and MAC3.

Figure 6:
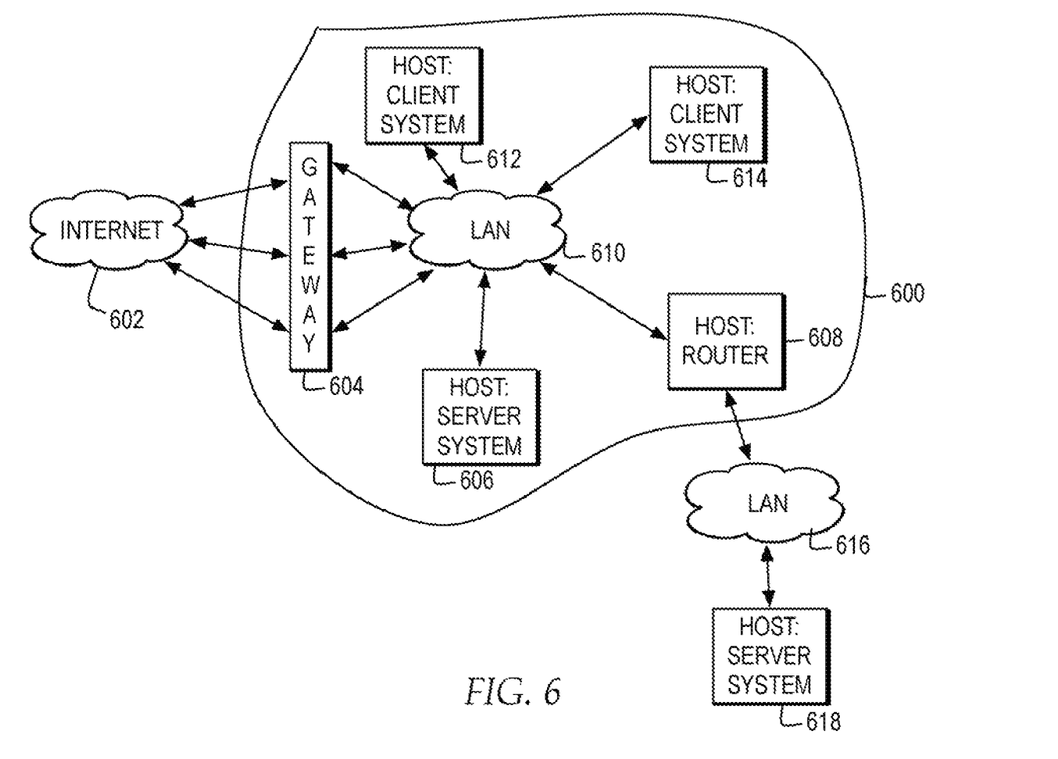
FIG. 6 is a block diagram illustrating an example of a network environment, including a gateway, in which the present invention may be implemented.

Referring now to FIG. 6, a block diagram illustrates an example of a network environment, including a gateway, in which the present invention may be implemented. In the example, a network environment includes a subnetwork 600 in which the hosts within subnetwork 600 detect and respond to APP packets from one another. For example, gateway 604, host 606, host 608, host 612, and host 614 communicate with one another via a local area network (LAN) 610. Gateway 604 may also communicate with other systems outside subnetwork 600 via internet 602. In addition, host 608 represents a router which may communicate through another LAN 616 with other systems, such as host 618.

In the example, any of the hosts within subnetwork 600 may broadcast ARP requests and ARP updates on LAN 610 which are received by all the other hosts within subnetwork 600. In addition, in the example, gateway 604 and the router of host 608 may provide an interface through which hosts within subnetwork 600 access systems outside of subnetwork 600.

Any of gateway 604 and hosts 606, 608, 612, 614, and 618 and any of LAN 610, LAN 616 and internet 602 may include one or more adapters and implement a network stack that enables the adapters to concurrently support multiple VIPAs, such as by implementing network stack 400. For example, gateway 604 may include multiple adapters, such as the multiple adapters described with reference to gateway 606 in FIG. 5.

Figure 7:
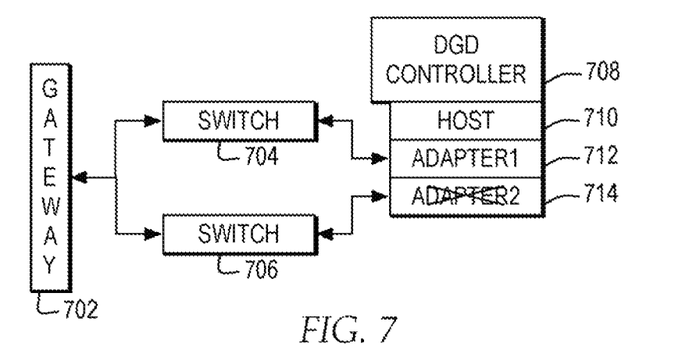
FIG. 7 is a flow diagram illustrating an example of a host system which supports multiple adapters enabled for concurrently supporting multiple VIPAs and which supports Dead Gateway Detection.

With reference now to FIG. 7, a flow diagram illustrates an example of a host system which supports multiple adapters enabled for concurrently supporting multiple VIPAs and which supports Dead Gateway Detection. In the example, host 710 supports Dead Gateway Detection (DGD) for detecting whether gateway 702 is down or not. In particular, host 710 may include or access a DGD controller 708 which controls detection of whether the interface of gateway 702 is functioning. In the example, host 710 sends a ping through one of adapter1 712 and adapter2 714 to gateway 702. Gateway 702 responds to pings from hosts to confirm that gateway 702 is functioning. If DGD controller 708 does not detect a response to the ping, DGD controller 708 may detect a dead gateway and attempt to identify an alternate gateway or provide an alert that the gateway is not functioning.

In the example, host 710 enables adapter1 712 and adapter2 714 to concurrently support multiple VIPAs. With multiple concurrent VIPA support enabled along with DOD controller 708, host 710 detects when one of adapters 712 and adapter2 714 have failed and updates gateway 702 with the hardware address of the functioning adapters, so that gateway 702 can respond to a ping to a functioning adapter and not falsely trigger DGD controller 708 to detect a dead gateway.

In particular, in the example, there are multiple paths from host 710 to gateway 702 through switches 704 and 706. DGD controller 708 may send pings to gateway 702 through either adapter1 712 through the path including switch 704 or through adapter2 714 through the path including switch 706. Gateway 702 responds, for example, to every other ping. If adapter2 714 fails, DGD controller 708 could detect gateway 702 as still functioning, if the ping response is routed through switch 704 to adapter1 712. However, if adapter2 714 fails, DGD controller 708 could also detect gateway 702 as not functioning, if the ping response is routed through switch 706 to adapter2 714. Therefore, at the same time that DGD controller 708 monitors whether gateway 702 is accessible through ping responses, host 710 detects whether each of adapter1 712 and adapter2 714 are functioning and sends ARP updates to gateway 702 in the event that any of adapter1 712 and adapter2 714 fail. In the example, in the event that adapter2 714 fails, adapter1 712 will send an ARP update for all the VIPAs supported on adapter1 712 to gateway 702. Gateway 702 receives the ARP update and updates the address for a ping response to be the MAC address of adapter1 712, such that DGD controller 708 will not detect a false dead gateway in the event that it is the adapter of host 710 that has failed and such that multiple VIPA failover controller 232 in host 710 facilitates a "path failover" to gateway 702 in the event of an adapter failover.

In one example, if a user may select to enable DGD controller 708 separately from enabling multiple VIPA failover controller 232. In another example, DGD controller 708 may be implemented within multiple VIPA failover controller 232 and receive updates of an adapter failure.

With reference now to FIG. 8, a high level logic flowchart illustrates a process and program for a network stack of a receiving host responding to a request from a requesting host, where the receiving host enables multiple adapters to concurrently support multiple VIPAs. In the example, the process starts at block 800 and thereafter proceeds to block 802. Block 802 illustrates receiving a request for the hardware address associated with an IP address. Next, block 804 depicts looking in a list of the multiple VIPA supported by the receiving host for the requested IP address. Thereafter, block 806 illustrates a determination whether the requested IP address is included in the VIPA list. If the requested IP address is not included in the VIPA list, then the process ends. If the requested IP address is included in the VIPA list, then the process passes to block 808. Block 808 illustrates triggering each adapter to send a response to the requesting host for the requested IP address with the adapter specified hardware address of each adapter, and the process ends. The request be implemented through an ARP request, the response may be implemented through an ARP response, and the specified hardware address may be a MAC address.

Referring now to FIG. 9, a high level logic flowchart depicts a process and program for a network stack for a receiving host responding to a failed adapter for facilitating failover when the requesting host enables multiple adapters to concurrently support multiple VIPAs. In the example, the process starts at block 900 and thereafter proceeds to block 902. Block 902 illustrates a determination whether the network stack detects a failed adapter. As previously described, different layers of the network stack may detect a failed adapter and pass an indicator of a failed adapter to another layer of the network stack or trigger the failover controller directly. At block 902 when the network stack detects a failed adapter, the process passes to block 904. Block 904 illustrates triggering each remaining functional adapter to broadcast an update on the network for each VIPA in the VIPA list with the adapter specified hardware address, such that each host on the network receives an update for each VIPA for each adapter, and the process ends. The update may be implemented through an ARP update and the specified hardware address may be a MAC address.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for managing failover in a host supporting a plurality of virtual IP addresses on a network, comprising:
    assigning a plurality of adapters to the host;
    assigning a plurality of virtual internet protocol (IP) addresses to the host;
    configuring each adapter of the plurality of adapters of the host to concurrently support each virtual IP address of the plurality of virtual IP addresses assigned to the host by configuring a transport layer of a network stack on the host to compare an IP address specified in an ARP request received at the host with a list of the plurality of virtual IP addresses and by assigning a separate MAC hardware address to each of the plurality of adapters in an adapter layer of the network stack;
    responsive to the host receiving an ARP request from at least one requesting host for a particular IP address, comparing the particular IP address at the transport layer with the list of the plurality of virtual IP addresses;
    responsive to the particular virtual IP address matching a selected virtual IP address within the plurality of virtual IP addresses, triggering, from the transport layer, each of the plurality of adapters in the adapter layer to send an ARP response to the at least one requesting host with each separate MAC hardware address of each separate adapter for the particular virtual IP address, wherein each at least one requesting host stores one of the plurality of ARP responses from the plurality of adapters;
    responsive to detecting a failure of at least one particular adapter from among the plurality of adapters in the adapter layer, triggering, from the transport layer, each remaining adapter from among the plurality of adapters in the adapter layer to broadcast a separate ARP hardware address update for each virtual IP address of the plurality of virtual IP addresses over the network with each separate MAC address for each remaining adapter, such that for a failover in the host supporting the plurality of virtual IP addresses the host directs at least one other host accessible via the network to address any new packets for the plurality of virtual IP addresses to one of the separate hardware addresses of one of the remaining adapters; and
    responsive to the at least one requesting host receiving the plurality of updates, redirecting by the at least one requesting host a bound connection to one of the plurality of virtual IP addresses to a particular one of the separate MAC addresses of one of the remaining adapters.

2. The method according to claim 1, further comprising:
    configuring the host and the at least one requesting host within a subnetwork to communicate via a local area network, wherein the at least one requesting host comprises at least one gateway and at least one other host, wherein the gateway communicates with a plurality of systems outside the subnetwork;
    monitoring, by the host, whether the gateway is functioning by a dead gateway detection controller, wherein each adapter of the plurality of adapters is communicatively connected to the gateway through a separate switch from among a plurality of switches providing a plurality of paths to the gateway over the local area network;
    periodically sending, by the dead gateway detection controller on the host, a ping to the at least one requesting host comprising the gateway via any of the plurality of adapters to determine if the gateway is functioning if the gateway returns a response to the ping, wherein the gateway stores one of the plurality of ARP responses from the plurality of adapters as the address for response to the ping; and
    responsive to the gateway receiving the separate ARP hardware address update for each virtual IP address, updating by the gateway the address for response to the ping to the particular one of the separate MAC addresses of one of the remaining adapters.

3. A system for managing failover, comprising:
    a host assigned a plurality of adapters and a plurality of virtual internet protocol (IP) addresses;
    the host comprising a network stack configured for each adapter of the plurality of adapters at an adapter layer of the network stack of the host to concurrently support each virtual IP address of a plurality of virtual IP addresses assigned to the host by configuring a transport layer of the network stack on the host to compare an IP address specified in an ARP request received at the host with a list of the plurality of virtual IP addresses and by assigning a separate MAC hardware address to each of the plurality of adapters in an adapter layer of the network stack;
    the host communicatively connected over a network to at least one requesting host; and
    the transport layer, responsive to the host receiving an ARP request from at least one requesting host for a particular IP address, for comparing the particular IP address at the transport layer with the list of the plurality of virtual IP addresses;
    the transport layer, responsive to the particular virtual IP address matching a selected virtual IP address within the plurality of virtual IP addresses, for triggering each of the plurality of adapters in the adapter layer to send an ARP response to the at least one requesting host with each separate MAC hardware address of each separate adapter for the particular virtual IP address, wherein each at least one requesting host stores one of the plurality of ARP responses from the plurality of adapters;
    the transport layer, responsive to detecting a failure of at least one particular adapter from among the plurality of adapters, for triggering each remaining adapter from among the plurality of adapters in the adapter layer to broadcast a separate ARP hardware address update for each virtual IP address of the plurality of virtual IP addresses over the network with each separate MAC address for each remaining adapter wherein for a failover in the host supporting the plurality of virtual IP addresses the host directs at least one other host accessible via the network to address any new packets for the plurality of virtual IP addresses to one of the separate hardware addresses of one of the remaining adapters, wherein responsive to the at least one requesting host receiving the plurality of updates, the at least one receiving host redirects a bound connection to one of the plurality of virtual IP addresses to a particular one of the separate MAC addresses of one of the remaining adapters.

4. The system according to claim 3, further comprising:

the host and the at least one requesting host within a subnetwork configured to communicate via a local area network, wherein the at least one requesting host comprises at least one gateway and at least one other host, wherein the gateway communicates with a plurality of systems outside the subnetwork;

the host for monitoring whether the gateway is functioning by a dead gateway detection controller, wherein each adapter of the plurality of adapters is communicatively connected to the gateway through a separate switch from among a plurality of switches providing a plurality of paths to the gateway over the local area network;

the host for periodically sending by the dead gateway detection controller on the host, a ping to the at least one requesting host comprising the gateway via any of the plurality of adapters to determine if the gateway is functioning if the gateway returns a response to the ping, wherein the gateway stores one of the plurality of ARP responses from the plurality of adapters as the address for response to the ping; and the gateway, responsive to the gateway receiving the separate ARP hardware address update for each virtual IP address, for updating the address for response to the ping to the particular one of the separate MAC addresses of one of the remaining adapters.

5. A program product comprising a computer-readable program stored in a non-transitory computer readable medium for managing failover in a host supporting a plurality of virtual IP addresses on a network, wherein the computer-readable program when executed on a computer causes the computer to:

assign a plurality of adapters to the host;

assign a plurality of virtual internet protocol (IP) addresses to the host;

configure each adapter of the plurality of adapters of the host to concurrently support each virtual IP address of the plurality of virtual IP addresses assigned to the host by configuring a transport layer of a network stack on the host to compare an IP address specified in an ARP request received at the host with a list of the plurality of virtual IP addresses and by assigning a separate MAC hardware address to each of the plurality of adapters in an adapter layer of the network stack;

responsive to the host receiving an ARP request from at least one requesting host for a particular IP address, compare the particular IP address at the transport layer with the list of the plurality of virtual IP addresses;

responsive to the particular virtual IP address matching a selected virtual IP address within the plurality of virtual IP addresses, trigger, from the transport layer, each of the plurality of adapters in the adapter layer to send an ARP response to the at least one requesting host with each separate MAC hardware address of each separate adapter for the particular virtual IP address, wherein each at least one requesting host stores one of the plurality of ARP responses from the plurality of adapters;

responsive to a failure of at least one particular adapter from among the plurality of adapters, trigger, from the transport layer, each remaining adapter from among the plurality of adapters in the adapter layer to broadcast a separate ARP hardware address update for each virtual IP address of the plurality of virtual IP addresses over the network with each separate MAC address for each remaining adapter, wherein responsive to the at least one requesting host receiving the plurality of updates, the at least one receiving host redirects a bound connection to one of the plurality of virtual IP addresses to a particular one of the separate MAC addresses of one of the remaining adapters.

6. The program product according to claim 5, wherein the computer-readable program is transmitted over a network.

7. The program product according to claim 5, wherein the computer-readable program when executed on the computer further causes the computer to:

configure the host and the at least one requesting host within a subnetwork to communicate via a local area network, wherein the at least one requesting host comprises at least one gateway and at least one other host, wherein the gateway communicates with a plurality of systems outside the subnetwork;

monitor, by the host, whether the gateway is functioning by a dead gateway detection controller, wherein each adapter of the plurality of adapters is communicatively connected to the gateway through a separate switch from among a plurality of switches providing a plurality of paths to the gateway over the local area network;

periodically send, by the dead gateway detection controller on the host, a ping to the at least one requesting host comprising the gateway via any of the plurality of adapters to determine if the gateway is functioning if the gateway returns a response to the ping, wherein the gateway stores one of the plurality of ARP responses from the plurality of adapters as the address for response to the ping; and responsive to the gateway receiving the separate ARP hardware address update for each virtual IP address, update by the gateway the address for response to the ping to the particular one of the separate MAC addresses of one of the remaining adapters.

* * * * *